US006495943B2

(12) United States Patent
Wetzel et al.

(10) Patent No.: US 6,495,943 B2
(45) Date of Patent: *Dec. 17, 2002

(54) SPACEBLOCK SCOOPS FOR ENHANCED ROTOR CAVITY HEAT TRANSFER

(75) Inventors: Todd Garrett Wetzel, Niskayuna, NY (US); Emil Donald Jarczynski, Scotia, NY (US); Christian Lee Vandervort, Voorheesville, NY (US); Samir Armando Salamah, Niskayuna, NY (US); Wayne Nigel Owen Turnbull, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/739,358

(22) Filed: Dec. 19, 2000

(65) Prior Publication Data

US 2002/0074872 A1 Jun. 20, 2002

(51) Int. Cl.[7] ............... H02K 1/22; H02K 1/32; H02K 9/00; H02K 9/06; H02K 3/24; H02K 5/18; H02K 5/20
(52) U.S. Cl. ............... 310/264; 310/65; 310/61
(58) Field of Search ............... 310/65, 264, 61

(56) References Cited

U.S. PATENT DOCUMENTS

| 1,819,860 | A | * | 8/1931 | Belfils ............... 310/61 |
| 1,927,890 | A | * | 9/1933 | Fechheimer ............... 171/207 |
| 2,786,951 | A | * | 3/1957 | Morgan ............... 310/61 |
| 2,833,944 | A | * | 5/1958 | Willyoung ............... 310/61 |
| 2,844,746 | A | * | 7/1958 | Coggeshall ............... 310/65 |
| 3,225,231 | A | * | 12/1965 | Kudlacik ............... 310/64 |
| 3,465,183 | A | * | 9/1969 | Wallenstein ............... 310/54 |
| 3,846,651 | A | * | 11/1974 | Mishra ............... 310/61 |
| 4,071,790 | A | * | 1/1978 | Darby et al. ............... 310/59 |
| 4,141,669 | A | * | 2/1979 | Darby et al. ............... 408/1 R |
| 4,301,386 | A | * | 11/1981 | Schweder et al. ............... 310/59 |
| 4,335,324 | A | * | 6/1982 | Fujioka et al. ............... 310/61 |
| 4,352,034 | A | * | 9/1982 | Karhan et al. ............... 310/59 |
| 4,365,177 | A | * | 12/1982 | Madsen ............... 310/61 |
| 4,415,822 | A | * | 11/1983 | Aiba ............... 310/59 |
| 4,486,676 | A | * | 12/1984 | Moore et al. ............... 310/52 |

(List continued on next page.)

FOREIGN PATENT DOCUMENTS

| CH | 648 439 | 3/1985 |
| DE | 100 27 377 | 12/2000 |

OTHER PUBLICATIONS

Patent Abstracts of Japan; vol. 006; No. 155 (E–125) Aug. 17, 1982; JP 57 078350.
Patent Abstracts of Japan; vol. 006, No. 155 (E–125) Aug. 17, 1982; JP 57 078338.
U.S. application Ser. No. 09/739,360 filed Dec. 19, 2000.
U.S. application Ser. No. 09/739,359 filed Dec. 19, 2000.
U.S. application Ser. No. 09/742,281 filed Dec. 22, 2000.
U.S. application Ser. No. 09/742,279 filed Dec. 22, 2000.
U.S. application Ser. No. 09/741,896 filed Dec. 22, 2000.

Primary Examiner—Nestor Ramirez
Assistant Examiner—Pedro J. Curvas
(74) Attorney, Agent, or Firm—Nixon & Vanderhye PC

(57) ABSTRACT

A gas cooled dynamoelectric machine is provided that is comprised of a rotor, a rotor winding comprising axially extending coils and concentric endwindings, and a plurality of spaceblocks located between adjacent endwindings thereby to define a plurality of cavities, each bounded by adjacent spaceblocks and adjacent endwindings. To enhance the heat transfer rate from the copper end turns of the field endwinding region, at least one scoop structure is provided adjacent the radially inner end of a cavity facing surface of at least one spaceblock for intercepting and redirecting coolant flow into the respective cavity. The spaceblock itself may have curved upstream and/or downstream surfaces for facilitating circulating coolant flow.

18 Claims, 5 Drawing Sheets

U.S. PATENT DOCUMENTS

| | | | | |
|---|---|---|---|---|
| 4,543,503 A | * | 9/1985 | Kaminski et al. | 310/59 |
| 4,546,279 A | * | 10/1985 | Hammer et al. | 310/59 |
| 4,656,382 A | * | 4/1987 | Moore et al. | 310/270 |
| 4,709,177 A | * | 11/1987 | Kaminski | 310/59 |
| 4,922,147 A | * | 5/1990 | Sismour et al. | 310/61 |
| 4,967,465 A | * | 11/1990 | Frank | 29/598 |
| 5,177,385 A | * | 1/1993 | Cooper et al. | 310/53 |
| 5,214,324 A | * | 5/1993 | Holmes | 310/52 |
| 5,252,880 A | * | 10/1993 | Kazmierczak et al. | 310/270 |
| 5,306,972 A | * | 4/1994 | Hokanson et al. | 310/58 |
| 5,343,101 A | * | 8/1994 | Matani | 310/58 |
| 5,593,274 A | * | 1/1997 | Carreno et al. | 415/115 |
| 5,644,179 A | | 7/1997 | Staub et al. | 310/65 |
| 5,757,094 A | * | 5/1998 | van Duyn | 310/58 |
| 6,188,153 B1 | * | 2/2001 | Hokanson | 310/52 |
| 6,204,580 B1 | * | 3/2001 | Kazmierczak | 310/52 |
| 6,252,318 B1 | * | 6/2001 | Kazmierczak | 310/61 |
| 6,339,268 B1 | * | 1/2002 | Kaminski et al. | 310/61 |
| 6,392,326 B1 | * | 5/2002 | Turnbull et al. | 310/270 |
| 6,417,586 B1 | * | 7/2002 | Jarczynski et al. | 310/61 |

* cited by examiner

SPACEBLOCK SCOOPS FOR ENHANCED ROTOR CAVITY HEAT TRANSFER

BACKGROUND OF THE INVENTION

The present invention relates to a structure for enhanced cooling of generator rotors by directing a greater volume of coolant flow into rotating endwinding cavities for increasing heat transfer therewithin.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed—the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

SUMMARY OF THE INVENTION

The above-mentioned needs are addressed by the present invention, in which the heat removal capability of a passive cooling system is improved by driving more cooling gas into the cavities formed between the concentric end turns, thereby reducing the regions of stagnant or low momentum flow and increasing heat transfer. More specifically, the present invention provides scoop structures as coolant flow deflectors to enhance coolant flow into the cooling cavities thus increasing the flow heat transfer rate.

Accordingly, as an embodiment of the invention, a dynamoelectric machine rotor is provided, having axially extending coils and end turns extending axially beyond at least one end of the body portion of the rotor with one or more spaceblocks located between concentric end turns. In one embodiment of the invention, at least one and preferably at least the inner spaceblocks have a scoop defined at the radially inner end of the forward facing side thereof, to intercept and direct coolant fluid flow radially outwardly into the respective cooling cavity.

In another embodiment, the spaceblock profile is modified to defined generally continuously curved circumferentially facing surfaces to intercept and direct coolant fluid flow radially outwardly into the respective cooling cavity and to facilitate the circulation of the cooling flow through the respective adjacent cavities.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
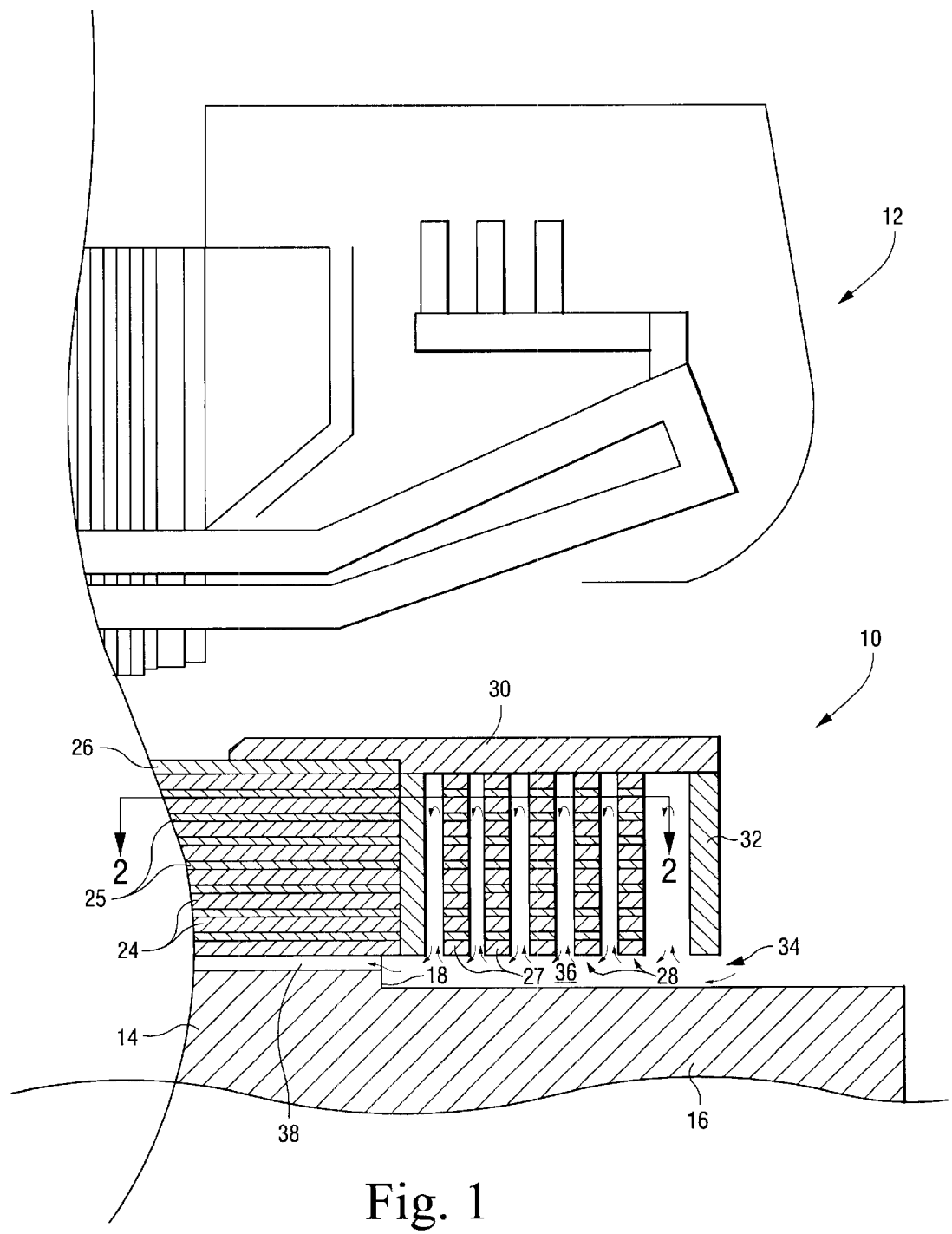
FIG. 1 is a cross-sectional view of a portion of the end turn region of a dynamoelectric machine rotor with stator in opposed facing relation thereto.
Figure 2:
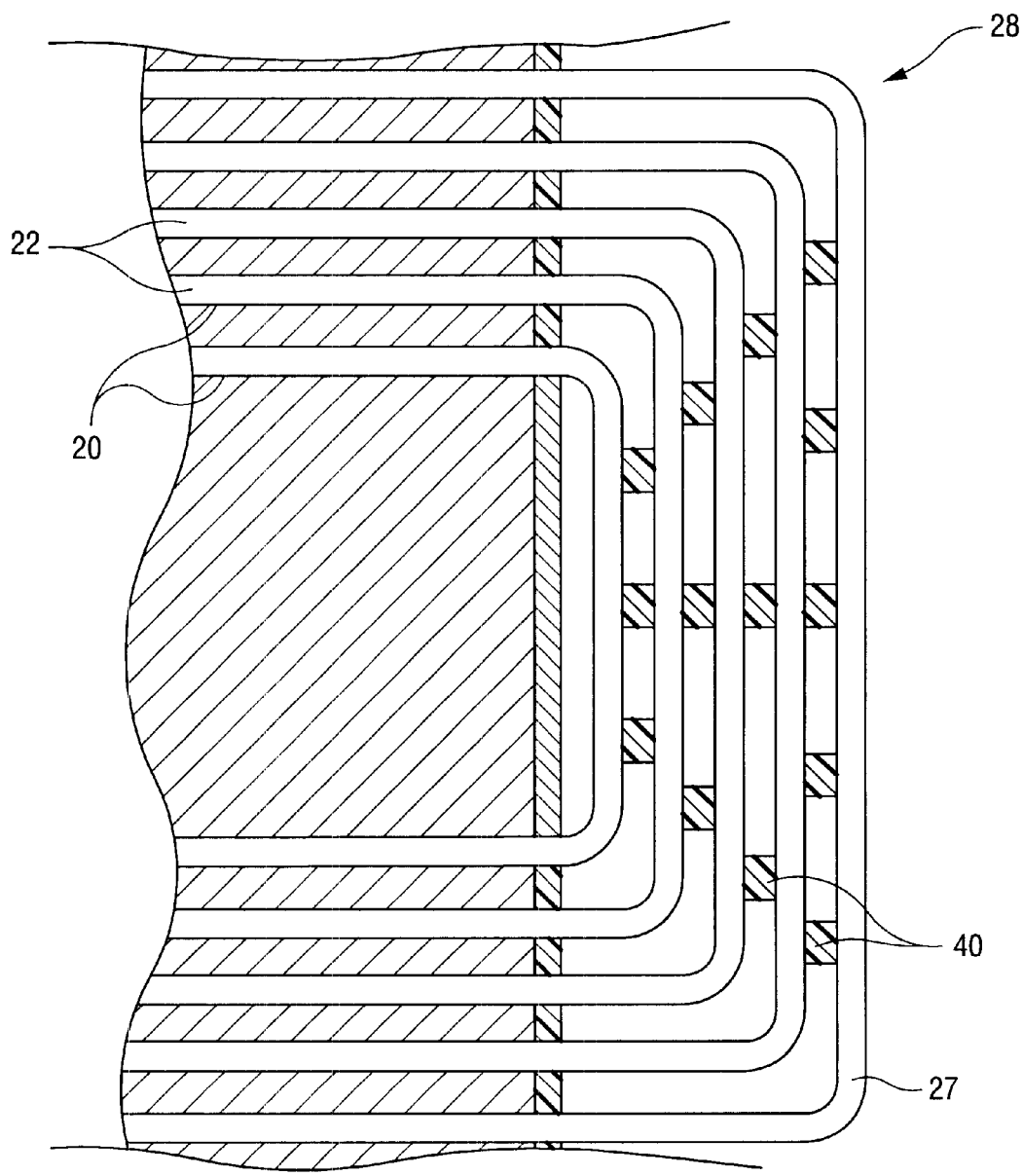
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns 27 at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner diameter of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns (hereinafter endwindings) are divided into cavities. These cavities are bounded on the top by the retaining ring 30 and on four sides by adjacent endwindings 28 and adjacent spaceblocks 40. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. Air flow is shown by the arrows in FIGS. 1 and 3.

Figure 3:
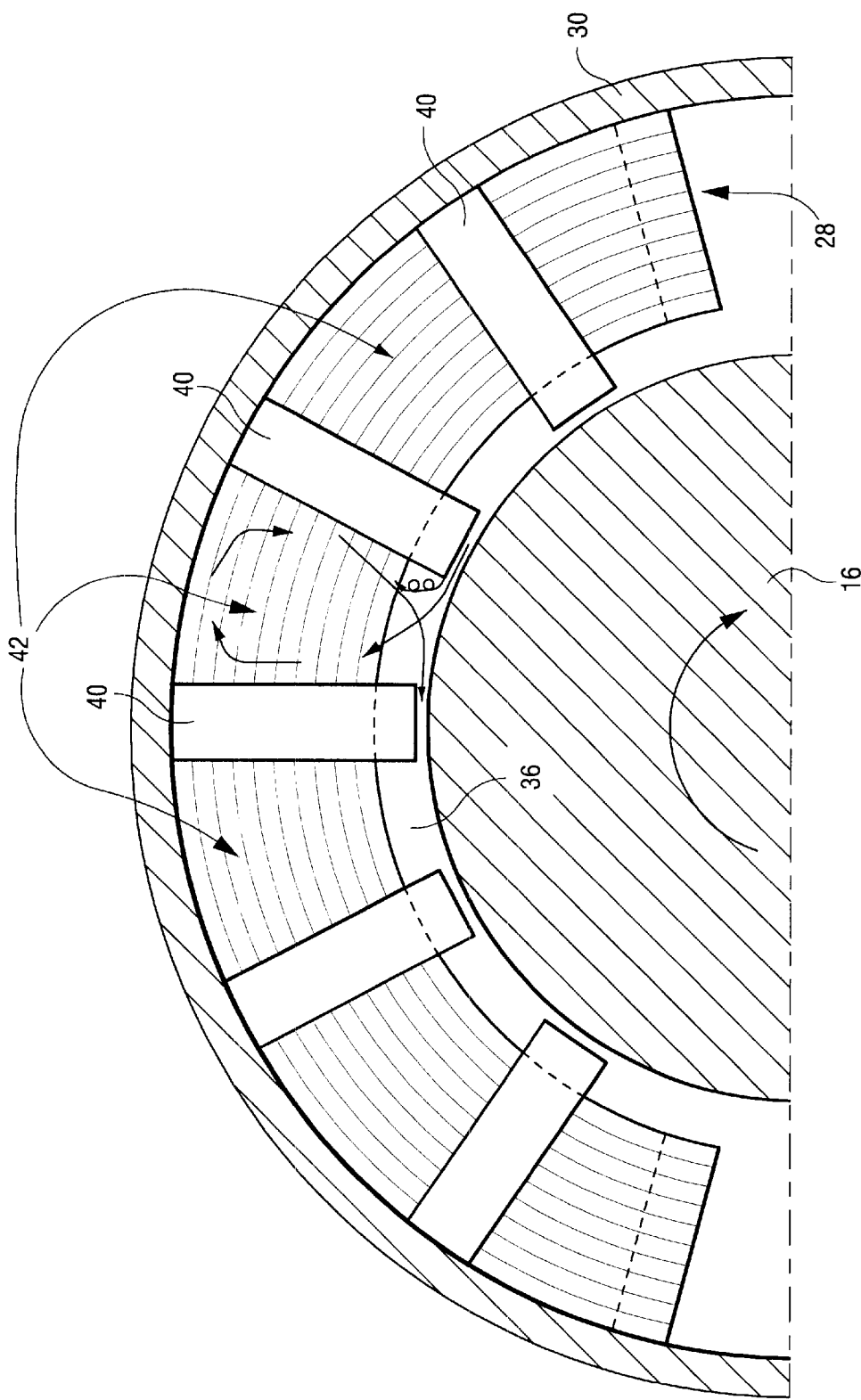
FIG. 3 is, a schematic illustration showing passive gas flow into and through endwinding cavities.
Figure 4:
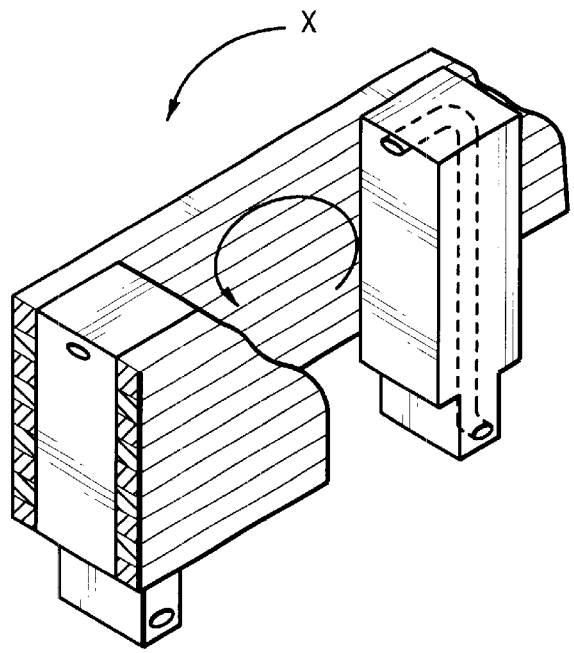
FIG. 4 is a perspective view, partly broken away of a portion of the rotor end turn region in accordance with a first embodiment of the invention disclosed in U.S. Pat. No. 5,644,179.
Figure 5:
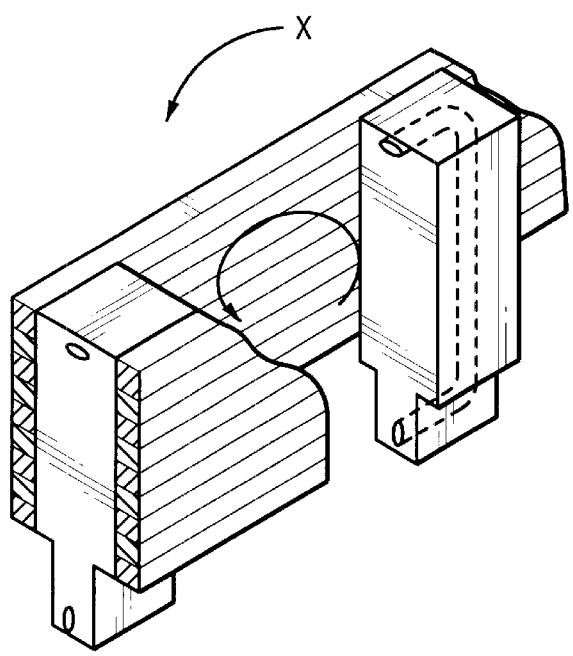
FIG. 5 is a perspective view, partly broken away, of a portion of the rotor end turn region showing a second embodiment of the invention of U.S. Pat. No. 5,644,179.

The inherent pumping action and rotational forces acting in a rotating generator cavity produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Figure 6:
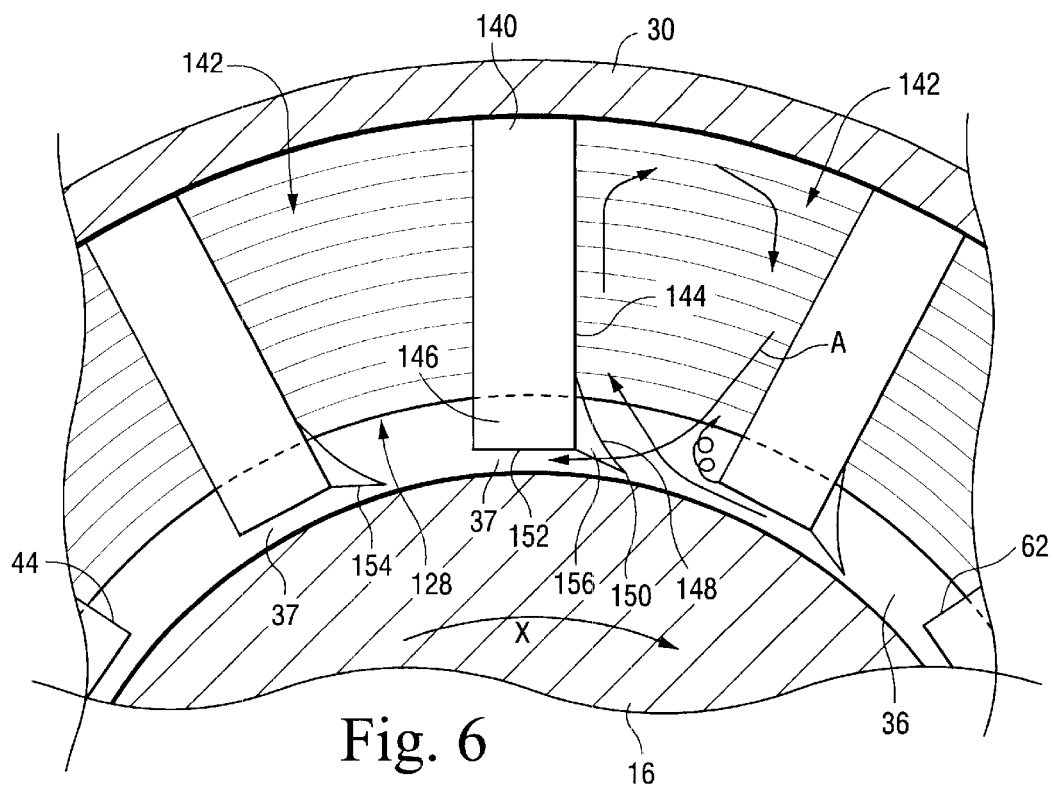
FIG. 6 is a partial, cross-sectional view illustrating a spaceblock configuration according to an embodiment of the invention.

Referring now to FIG. 6, there is illustrated a partial section of the rotor end winding showing end winding cavities 142 with the direction of rotation indicated by arrow X. To increase coolant flow into the respective endwinding cavities, in accordance with a first embodiment of the invention, at least one spaceblock 140 is provided with a scoop structure 156 on the downstream side of the respective cavity with respect to the direction of coolant flow across the bottom of the cavity, defined by the upstream surface 144 of the respective spaceblock 140, and at the radially inward end of the respective spaceblock. The scoop structure 156 is provided for increasing the amount of cooling fluid forced into the cavity, thereby increasing the circulating flow inside the cavity, to thereby increase heat removal from the respective cavity. In the illustrated embodiment, the scoop structure 156 extends in an upstream direction from the spaceblock 140 a distance of at least about 20% and more preferably about 20–40% of the circumferential dimension of the cavity radially inner end. Further, in the illustrated embodiment, the scoop structure 156 extends downwardly, that is radially inwardly, so as to capture about one half of the radial dimension of the gap 37 that is defined between the spaceblock and the spindle.

More specifically, each scoop structure 156 includes a generally continuously curved upper surface 148 terminating at a radially inner edge 150. As illustrated, the radially inner edge 150 of the scoop structure 156, which defines a flow intercepting line along at least a portion of the depth of the spaceblock, extends below the radially inner surface 152 of the spaceblock 140 so as to intercept and redirect flow otherwise destined for the gap 37 between the spaceblock 140 and the spindle 16. The surface 154 of the scoop structure 156 downstream of the radially inner edge 150 defines a generally gradual transition to the radially inner surface 152 of the spaceblock, which in the embodiment of FIG. 6 is of generally conventional configuration.

To guide and direct the flow into the cavity and along the spaceblock, the curved upper surface 148 of the scoop structure 156 extends upwardly along the spaceblock upstream surface 144 a distance greater than the distance by which the scoop extends below the spaceblock radially inner surface 152. The scoop may extend along substantially the entire axial dimension of the spaceblock or may be provided as a truncated structure or series of truncated structures so that only a part of the flow is intercepted and deflected to circulate through the cavity 142, to facilitate flow to the next circumferentially adjacent cavity as shown by arrow A.

In a presently preferred embodiment, a single scoop is provided that spans a substantial portion of the depth or axial dimension of the cavity, for example, at least about 75% and more preferably on the order of 100% of the depth of the cavity. In the alternative, however, each scoop structure can extends only a part depth or part axially of the spaceblock so as to leave at least one bypass flow region for flow to the next downstream adjacent cavity. According to this alternative embodiment, a partial depth scoop structure may be disposed to span the part depth of the cavity from adjacent one endwinding wall of the cavity, adjacent the other endwinding wall of the cavity, or generally centrally of its associated spaceblock. In an exemplary embodiment, a single scoop structure is provided to span at least about one half of the depth of the associated spaceblock. According to a further alternate embodiment, two or more axially aligned scoop structures may be provided, each spanning a portion of the axial dimension or depth of the cavity. In this manner, at least one bypass flow region is provided for flow to the next downstream adjacent cavity.

In operation, rotor rotation will cause cooling gas to be drawn through the gas inlet 34 into the annular region 36 between the endwindings 28 and the rotor spindle 16. A kinetic pressure head will be present which will drive the cooling the gas to and along the scoop structures 156 provided at the downstream end of the cavity. The cooling gas is directed therefrom along the upstream surface 144 of the spaceblock 140 to circulate through the cavity 142. Because the scoop intercepts flow that might otherwise continue into and through gap 37 between the spaceblock 140 and spindle 16, the coolant flow through the respective cavity is increased to thereby increase heat transfer.

In the illustrated embodiment, five spaceblocks are illustrated as associated with the respective endwinding structure and the scoop structure 156 of the invention is illustrated as being provided on the three intermediate spaceblocks 140. It is to be understood that the scoop is preferably not provided on the upstream face of the first spaceblock of the endwinding assembly with respect to the direction of coolant flow, because no circulating flow cavity is defined immediately upstream thereof. The most downstream spaceblock is also illustrated as having no scoop structure. It is to be appreciated, however, that a scoop structure may be provided on this endwinding spaceblock if deemed necessary or desirable to enhance the cooling circulating flow in the cavity defined immediately upstream thereof.

Figure 7:
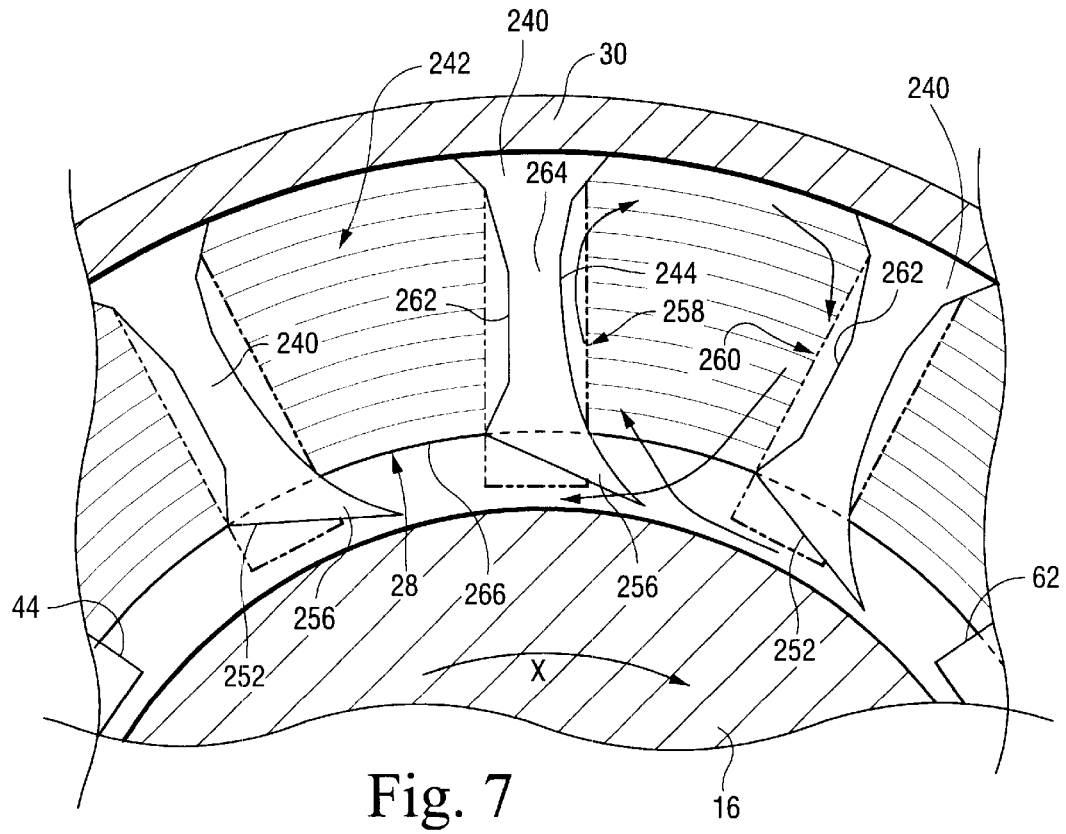
FIG. 7 is a cross-sectional view similar to FIG. 6 showing a spaceblock configuration according to an alternate embodiment of the invention.

Turning now to FIG. 7, an alternate embodiment of the present invention is shown. FIG. 7 illustrates spaceblocks 240 configured to provide for an interception and scooping of coolant flow in the annular cavity and further to enhance the circulating flow within the respective cavities. More specifically, in the FIG. 7 embodiment, the scoop structure 256 is made integral with the spaceblock 240 and the spaceblock itself is contoured to ease the transition of flow through the cavity.

In the illustrated embodiment, cavity side 258 is generally characterized as the downstream side of the cavity with respect to the coolant flow and is thus defined by the upstream surface 244 of the spaceblock. Cavity side 260 is generally characterized as the upstream side of the cavity and is thus defined by the downstream surface 262 of the spaceblock disposed upstream of the respective cavity. In the embodiment of FIG. 7, the spaceblocks 240 themselves are contoured to ease the transition of flow along each of the sides of the cavity. Thus, the radial central region 264 of the spaceblock 240 is made narrower in the circumferential direction than the rest of the spaceblock. Reducing the size of this portion of the spaceblock, to define generally curved upstream 244 and downstream 262 faces, the circulatory-flow resistance of the cavity is reduced and more even flow and thus higher heat transfer is encouraged.

The second embodiment functions in generally the same manner as the first embodiment in that the cooling gas is driven in the annular channel 36 whereupon it is intercepted by a respective scoop structure 256 to thereby flow generally radially outwardly with respect to the rotor axis in a circulating flow within the respective cavity 242. As illustrated, the curvature of the downstream side 258 of the cavity, defined by upstream wall 244 of the respective spaceblock 240, directs the flow in a generally circular flow path toward the retaining ring 30, toward the next upstream adjacent spaceblock and along the contoured circumferential downstream surface 262 thereof. In the illustrated embodiment, the circumferential surface 262 of the spaceblock terminates generally at about the radially inner end 266 of the end winding structure whereupon the flow reenters the annular path 36 defined between the endwindings 28 and the spindle 16.

In the embodiment illustrated in FIG. 7, three of the five spaceblocks associated with the illustrated end windings 28 are reconfigured to enhance circulating coolant flow and heat transfer. It is to be appreciated that the first surface of the most upstream spaceblock is preferably not configured to intercept and redirect coolant flow as, typically, there is no coolant circulating cavity defined immediately upstream thereof. Although not illustrated in FIG. 7, the downstream surface 62 of the first spaceblock may be configured to enhance the circulating flow in the respective cavity. Similarly, although not illustrated, the upstream surface 44 of the final spaceblock may include a scoop structure and be concavely curved to encourage an enhanced circulating flow in the respective cavity. The downstream surface thereof, however, is not associated with a recirculating coolant flow cavity and therefore a reconfigured surface thereof is not deemed necessary or desirable except to the extent that a savings and benefit is seen from commonly configuring all spaceblocks associated with the endwinding 28.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and end turns defining a plurality of endwindings extending axially beyond at least one end of said body portion;
   at least one spaceblock located between adjacent said endwindings so as to define a cavity therebetween; and
   at least one scoop structure provided adjacent a radially inner end of a cavity facing surface of at least one spaceblock for intercepting and redirecting coolant flow into the respective cavity.

2. The dynamoelectric machine of claim 1, wherein said scoop structure is disposed on a circumferentially oriented surface of said spaceblock, on a downstream side of said cavity.

3. The dynamoelectric machine of claim 1, wherein a single scoop structure is provided on said spaceblock.

4. The dynamoelectric machine of claim 3, wherein said single scoop structure spans at least about one half of a depth of said cavity.

5. The dynamoelectric machine of claim 1, wherein said scoop structure is integrally formed with said spaceblock.

6. The dynamoelectric machine of claim 5, wherein said scoop structure is defined on a first circumferentially oriented surface of said spaceblock, defining a downstream side of said cavity, and wherein said circumferentially oriented surface is curved to facilitate circulating coolant flow into and through said cavity.

7. The dynamoelectric machine of claim 6, wherein a second circumferentially oriented surface of said spaceblock defines a upstream side of a cavity immediately downstream thereof, and wherein said second surface is generally curved to facilitate circulating coolant flow.

8. The dynamoelectric machine of claim 1, wherein each said scoop structure extends from the spaceblock at least about 20% of the circumferential dimension of the respective cavity.

9. The dynamoelectric machine of claim 1, wherein each said scoop structure extends radially inwardly beyond a radially inner end of said spaceblock.

10. A gas cooled dynamoelectric machine, comprising:
    a rotor having a spindle and a body portion;
    a rotor winding comprising axially extending coils disposed on said body portion and spaced, concentric endwindings extending axially beyond at least one end of said body portion, said endwindings and said spindle defining an annular space therebetween;
    a plurality of spaceblocks located between adjacent ones of said endwindings thereby to define a plurality of cavities, each bounded by adjacent spaceblocks and adjacent endwindings and open to said annular space; and
    at least one scoop structure provided adjacent the radially inner end of a cavity facing surface of at least one spaceblock for intercepting and redirecting coolant flow into the respective cavity.

11. The dynamoelectric machine of claim 10, wherein said scoop structure is disposed on a circumferentially oriented surface of said spaceblock, on a downstream side of said cavity.

12. The dynamoelectric machine of claim 10, wherein a single scoop structure is provided on said spaceblock.

13. The dynamoelectric machine of claim 12, wherein said single scoop structure spans at least about one half of a depth of said cavity.

14. The dynamoelectric machine of claim 10, wherein said scoop structure is integrally formed with said spaceblock.

15. The dynamoelectric machine of claim 14, wherein said scoop structure is defined on a first circumferentially oriented surface of said spaceblock defining a downstream side of said cavity and wherein said circumferentially oriented surface is curved to facilitate circulating coolant flow into and through said cavity.

16. The dynamoelectric machine of claim 15, wherein a second circumferentially oriented surface of said spaceblock defines a upstream side of a cavity immediately downstream thereof, and wherein said second surface is generally curved to facilitate circulating coolant flow.

17. The dynamoelectric machine of claim 10, wherein each said scoop structure extends from the spaceblock at least about 20% of the circumferential dimension of the respective cavity.

18. The dynamoelectric machine of claim 10, wherein each said scoop structure extends radially inwardly toward said spindle, beyond a radially inner end of said spaceblock, for intercepting coolant flow in said annular space.

* * * * *